Oct. 24, 1967 F. H. BRAY ETAL 3,349,187

REED RELAY ARRAY

Filed Jan. 16, 1964 3 Sheets-Sheet 1

Inventors:
F. H. BRAY
J. A. W. BUTCHER
By Phillip A. Weiss
Attorney

Inventors
F.H. BRAY
J. A. W. BUTCHER
By [signature]
Attorney

Inventors
F. H. BRAY
J. A. W. BUTCHER
By Phillip A. Weiss
Attorney

United States Patent Office 3,349,187
Patented Oct. 24, 1967

3,349,187
REED RELAY ARRAY

Frederick Harry Bray and John Anthony Weeks Butcher, London, England, assignors to International Standard Electric Corporation, New York, N.Y., a corporation of Delaware Filed Jan. 16, 1964, Ser. No. 338,217
Claims priority, application Great Britain, Feb. 1, 1963, 4,264/63
7 Claims. (Cl. 179—18)

ABSTRACT OF THE DISCLOSURE

An electrical switching arrangement for establishing a connection between one of a plurality of first circuits and one of a plurality of second circuits. The arrangement can be provided in matrix form. The arrangement comprises reed relays having contacts for interconnecting first and second circuits. The reed relays are operated through circuits including contact means and diode means and held through circuits including contacts on the reed relays. The diodes are poled so that in one plane of the matrix they act as lock-out devices while in the other plane they act as decouplers.

The present invention relates to switching arrangements for use in automatic telecommunication exchanges, and more particularly to reed relay switching networks where connections between inlets to and outlets from the switching network are established over the contacts of high speed relays, such as the so-called reed relays.

In such systems where call settings are effected electronically it is usual to provide an electronic or semi-electronic scanning arrangement in addition to the switching network. The scanning arrangements are additional to the switching network and consequently unduly increase the expense and complexity of the systems. An object of the present invention is to avoid or to reduce this expense and complexity.

According to the present invention there is provided an electrical switching arrangement for establishing a connection from any one of a set of first circuits to a single second circuit. The arrangement comprises a high speed electro-magnetic relay for each possible first circuit-second circuit connection. A commoned connection is provided from one side of the windings of all of said relays via a resistive impedance to a point to which a D.C. supply source is connected when the arrangement is in use. An operating circuit for each of said relays is connected to the other side of the windings. An operating potential is applied to a relay over its operating circuit when the relay's first circuit is to be connected to the second circuit. A holding circuit for each of said relays is also connected to the other side of the windings and includes a contact controlled by each relay and a unidirectionally conductive device. The arrangement is such that when one of said relays operates it is maintained operated via its holding circuit and that the potential across said resistive impedance due to the current in said holding circuit causes the said unidirectionally conductive devices of all other relay's holding circuits to be set to their high impedance states so that only one relay can remain operated at any one time.

Embodiments of the invention will now be described with reference to the accompanying drawings, in which:

FIGS. 1*a* and 1*b* show in greatly simplified block diagram and schematic forms respectively a circuit according to the present invention whereby three subscriber's lines have access to a single link.

The invention is described herein in its application to reed relay switching networks for connecting calling subscriber's lines to links which ultimately give access to registers and to subsequent switching stages. Thus in the arrangements to be described herein the inlets to the switching network are subscriber's lines and the outlets therefrom are links. However, the invention is equally applicable to other stages of the exchange. Thus it could be used for connecting an inlet to switching stage to any one of a particular wanted group of outlets therefrom.

Figure 1A:
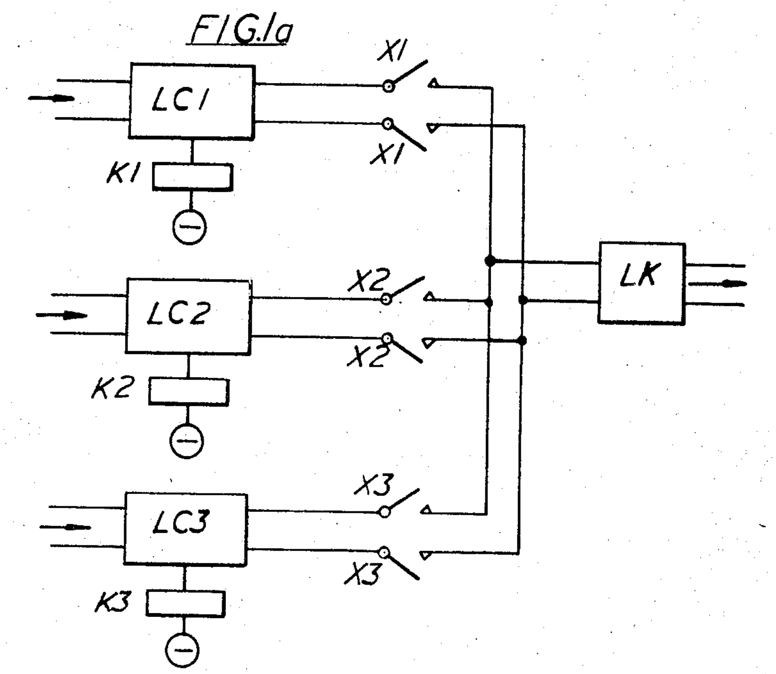
Figure 1B:
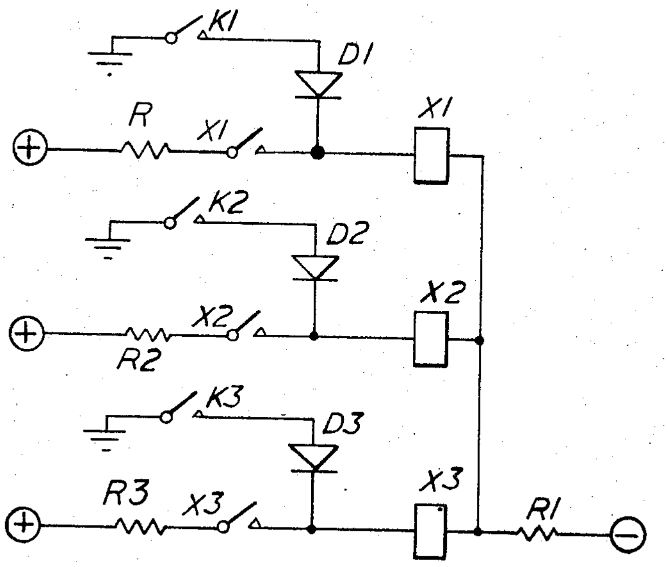

FIGS. 1*a* and 1*b* show three subscriber's line circuits LC1, LC2, LC3 in simplified form, and a single link circuit LK. Each line circuit has a calling relay such as K1 which is operated when that line assumes the calling condition and remains operated until that subscriber hangs up. When a calling subscriber's K relay, e.g. K2 operates, it closes a contact in the operating circuit of the reed relay X2 which controls the cross-point contacts between that line and the link LK. Thus, assuming that only one line of the group is in the calling condition, relay X2 operates from ground via the closed contact K2 of the caller's K relay, a semiconductor diode D2, the winding of the relay K and a common resistor R1.

Responsive to the operation of relay X2, cross-point contacts X2′ close to connect the calling line to the link LK, and to complete a locking circuit for itself. The latter circuit extends from positive battery via a resistor R2, contacts X2′ of relay X2, winding of relay X2 and common resistor R1 to negative battery. When the relay has fully operated and locked in its locking circuit, the potential at the junction between its windings and the common resistor R1 moves positive to a value such that the diodes D1 and D3 associated with the other relays X1 and X3 are reverse biased. Hence the other lines are denied access to the link LK which has been seized by the calling line connected to line circuit LC2. The values of the resistors R1 and R2 and the battery voltages are selected so as to produce this effect, and these values vary in accordance with the parameters of the reed relays used.

Reed relays can normally be expected to operate in about one millisecond, and it is not considered likely that the calling rate in a group of lines will exceed one per millisecond. If the calling rate does exceed one per millisecond, then two or more K contacts would be operated at the same time. However, if this occurs multiple seizure would not in practice be possible. The reason for this is that, even though the reed relays used are nominally identical, they exhibit slightly different operating times as a result of manufacturing tolerances. Thus the relay, with the fastest operating time closes its locking circuit before the other or others, which, however, by this time have partially operated. As the moving parts of the reed relays are of light weight, their mechanical inertia is low, and so it is possible to rapidly reverse the motion of the partially operated reed relays by removing the initial current in their operating circuits.

To revert to FIG. 1, assume that the lines connected to line circuits LC1 and LC3 initiate calls simultaneously, and that relay X3 has a slightly quicker operating time than does relay X1. Relays K1 and K3 are both operated, completing over their contacts the operating circuits of the cross-point relays X1 and X3, both of which commence to operate. Since relay X3 has the quicker operate time it completes its locking circuit via its resistor R3 before relay X1 completes its locking circuit. The immediate rise in potential at the junction of resistor R1 and the relays X1, X2 and X3 reduces the current in the winding of relay X1 to such an extent that it cannot complete its operation, and consequently relay X1 releases. Thus only one relay has operated fully, and there has been no multiple seizure of the link.

Tests of a large number of nominally identical reed relays have shown that when two relays attempt to operate at the same time, at least one contact of the slower relay can operate and then release after about a millisecond. Where three relays attempted to operate at the same time, none of the relays fully operated and locked, that is, after a period of instability they all end up released. Such a case would be rare in practice, and if it occurred, one caller would hang up. This would mean that only two would be left competing for the link, and one of these two would seize it, as described above.

It must again be emphasized that the values for the resistors R1 and R2 and the battery voltages must be correctly selected in accordance with the reed relay parameters. However, this selection can be effected by simple calculations and experiment.

In one example the reed relays have windings of nominal resistance 1800 ohms, and two such relays which were tested had actual resistances of 1695 ohms and 1810 ohms. The inductances of these relays were 3.2 and 3.35 henries respectively. The positive voltage supply was 200 volts and the negative voltage supply was −105 volts, the common resistor (R1) having a value of 3.2K. ohms, whilst the other resistors had values of 2K. ohms.

Figure 2:
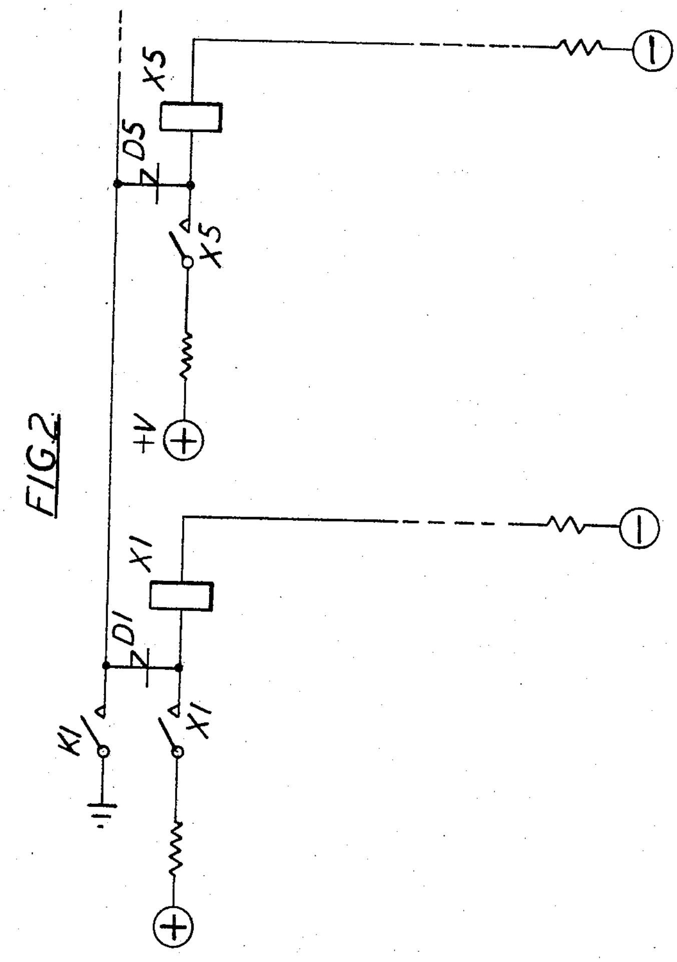
FIG. 2 shows a circuit by which one subscriber's line has access to two links.

FIG. 2 shows the reed relay arrangement for the case in which at least two links are accessible to one calling line. Thus the closure of the contact K1, when that line initiates a call, completes the operating circuits for the cross-point relays X1, X5 . . ., whose contacts give the line access to the respective ones of the links. In this case the operation of one of the relays X1, X5, . . . does not of itself prevent further relays from operating, and the diodes such as D1 and D5 now act as decoupling elements.

Figure 3:
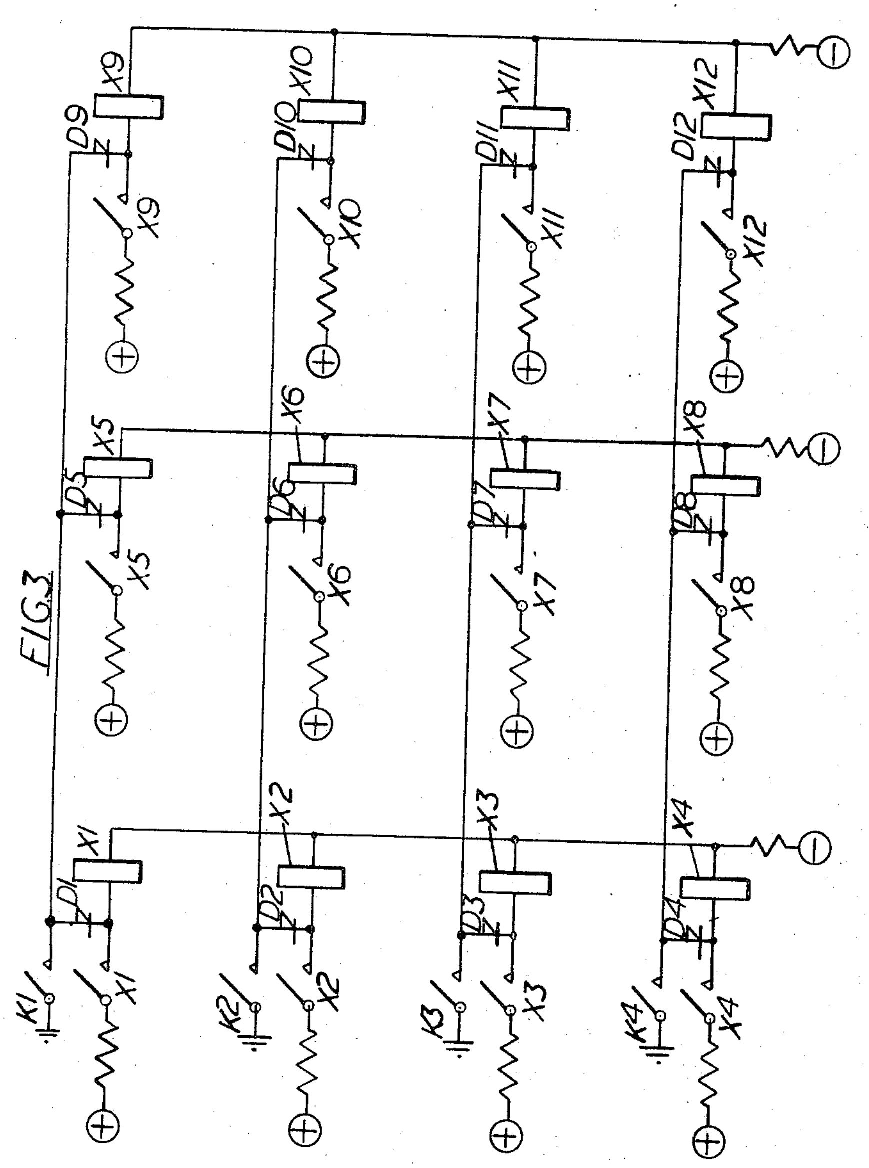
FIG. 3 is an arrangement, derived from FIGS. 1 and 2, in the form of a reed-relay matrix capable of establishing connection between four subscriber's lines and three links.

FIG. 3 shows the reed relay arrangement for establishing connections between a set of four inlets-subscriber's lines, and a set of three outlets-links. In view of the foregoing description no description of this figure is needed, except to point out that it emphasizes the dual functions of each diode, as a switching element in one plane and as a decoupling element in the other plane.

In the circuits described above, the arrangements for releasing the connections are not described as they can follow conventional practice.

While the principles of the invention have been described above in connection with specific apparatus and applications, it is to be understood that this description is made only by way of example and not as a limitation on the scope of the invention.

What we claim is:

1. An electrical switching arrangement for establishing a connection from any one of a plurality of first circuits to a single second circuit, said arrangement comprising a high speed electro-magnetic relay associated with each first circuit-second circuit connection, common connection means for connecting one side of the winding of each of said high speed relays to a point connected to a D.C. supply source when the arrangement is in use, said common connection including a series resistor, an operating circuit individual to each of said first circuits connected to the other side of the winding of each of said high speed relays, said operating circuits each including an unidirectional conductive means, contact means in series with said unidirectional conductive means operated responsive to a calling condition of one of said first circuits for completing a selected one of said operating circuits by enabling current to flow in the winding of the said high speed relays associated with said calling first circuit through said unidirectional conductive means, a holding circuit for each of said relays also connected to the other side of said winding including a holding potential connected to the winding through a contact controlled by the high speed relay being held, said holding potential being of a polarity that back biases said unidirectional conductive means to lock out the other of said first circuit by causing a current in said series resistor which provides a voltage drop that prevents the operating circuits of all of the other high speed relays from operating so that only one high speed relay can operate at any one time, and further contact means on said high speed relays for completing the associated first-second circuit connection.

2. The arrangement of claim 1 wherein said contact means comprises a set of contacts individually associated with each high speed relay to control the operation of the associated high speed relay.

3. The arrangement of claim 1 wherein said contact means comprises a single contact associated with a plurality of high speed relays for controlling the operation of said associated high speed relays.

4. An arrangement as claimed in claim 1, and which comprises a set of second circuits each of which is accessible when free to any one of said first circuits, so that the arrangement is a co-ordinate switching matrix, wherein the sets of relays giving access to the respective ones of said second circuits are similarly arranged, and wherein each said unidirectional conductive device acts as a lock-out device in respect of connections to its second circuit and a decoupling device in respect of connections from its first circuit.

5. An arrangment as claimed in claim 1 in which each said unidirectionally conductive device is a semiconductor diode.

6. An arrangement as claimed in claim 1 in which each said high speed relay is a sealed-contact reed relay.

7. A network as claimed in claim 1, in which each said first circuit is a subscriber's line circuit and the said second circuit is a link via which communication connections can be established.

References Cited

UNITED STATES PATENTS

| | | | |
|---|---|---|---|
| 2,320,076 | 5/1943 | Hall | 179—18.3 |
| 2,954,438 | 9/1960 | Bray et al. | 179—18.3 |
| 2,962,557 | 11/1960 | Radcliffe et al. | 179—18.7 |
| 3,136,863 | 6/1964 | Melvin | 179—18.3 |
| 3,188,423 | 6/1965 | Glenner et al. | 179—18.7 |
| 3,280,267 | 10/1966 | Feucht | 179—18.7 |

OTHER REFERENCES 705,514 3/1965 Canada.

KATHLEEN H. CLAFFY, *Primary Examiner.*

WILLIAM C. COOPER, *Examiner.*

L. A. WRIGHT, *Assistant Examiner.*